United States Patent [19]

Kant

[11] Patent Number: 5,487,072
[45] Date of Patent: Jan. 23, 1996

[54] ERROR MONITORING ALGORITHM FOR BROADBAND SIGNALING

[75] Inventor: Krishna Kant, Township of Marlboro, Monmouth County, N.J.

[73] Assignee: Bell Communications Research Inc., Morristown, N.J.

[21] Appl. No.: 269,267

[22] Filed: Jun. 30, 1994

[51] Int. Cl.$^6$ .......................... G06F 11/00; G08C 25/02; H04L 1/18
[52] U.S. Cl. .............................. 371/32; 371/5.1; 379/273
[58] Field of Search .......................... 371/5.1, 32, 29.1, 371/33, 20.3, 20.2; 370/91; 375/109; 379/272, 273, 1, 2, 14, 15

[56] References Cited

U.S. PATENT DOCUMENTS

| | | | |
|---|---|---|---|
| 4,328,581 | 5/1982 | Harmon et al. | 371/5.1 |
| 4,750,171 | 6/1988 | Kedar et al. | 370/94 |
| 4,939,731 | 7/1990 | Reed et al. | 371/5.5 |
| 4,970,914 | 11/1990 | Chen et al. | 370/94.1 |
| 5,031,179 | 7/1991 | Yoshida et al. | 371/5.5 |
| 5,084,877 | 1/1992 | Netravali et al. | 370/94.1 |
| 5,150,368 | 9/1992 | Autruong et al. | 371/5.1 |
| 5,224,095 | 6/1993 | Woost et al. | 371/33 |

OTHER PUBLICATIONS

A. Tanenbaum, *Computer Networks*, 2nd Ed., Prentice Hall, 1988, Section 4.4, pp. 228–239.
V. Ramaswami and J. L. Wang, "Analysis of the Link Error Monitoring Protocols in the Common Channel Signalling Network," *IEEE Transactions on Networking*, vol. 1, Nov. 1, 1993, pp. 31–47.

D. C. Schmidt, "Safe and Effective Error Rate Monitors for SS7 Signaling Links", *IEEE Journal of Selected Areas in Communications*, vol. 12, Apr. 1994, pp. 446–455.

TD PL/II–20C Rev1, "BISDN–ATM Adaptation Layer–Service Specific Connection Oriented Protocol", S. Quinn (ed.), 1993.

*Primary Examiner*—Robert W. Beausoliel, Jr.
*Assistant Examiner*—Albert Décady
*Attorney, Agent, or Firm*—Leonard Charles Suchyta; James W. Falk

[57] ABSTRACT

The error performance of an ATM signaling link operating under the service specific connection oriented protocol (SSCOP) is monitored by determining the maximum retransmission count (i.e., the number of times a message has to be retransmitted from a transmitting to a receiving end) amongst those messages retransmitted within a polling interval. A quality of service (QOS) factor is the average maximum retransmission count at the end of N consecutive polling intervals. If the QOS factor is greater than a predetermined threshold, then the link is taken out of service.

14 Claims, 2 Drawing Sheets

ERROR MONITORING ALGORITHM FOR BROADBAND SIGNALING

BACKGROUND OF THE INVENTION

This invention relates to error monitoring of links in digital transmission systems and more particularly, to error monitoring of signaling links in high speed ATM networks.

In telecommunication networks, two types of information must be transmitted between the nodes: (a) user payload (e.g., voice, video, or data); and (b) signaling information to control (e.g., set-up and tear-down) the logical paths carrying the user payload. In the current telephone network, the signaling information is carried by a separate network known as the common channel signaling (CCS) network. In high speed ATM (asynchronous transfer mode) networks, the signaling information is carried on separate virtual circuits in the same physical network. Thus, while a CCS link is a physical link, an ATM signaling link is only a "virtual circuit". In either case, assuring integrity of signaling links is essential for meeting the stringent performance/reliability constraints of the signaling network. This is accomplished by deploying links in pairs, where each member of the pair is on a separate physical path and carries only one-half of the engineered traffic. The two links are constantly monitored for errors, and if either of them experiences a high error rate, its traffic is switched over to its mate.

Error monitoring algorithms are used in CCS networks. Error monitoring in ATM networks, however, is not currently being performed. This is because ATM networks until now have only sought to provide permanent virtual circuits (PVCs), i.e., virtual circuits that are provisioned and then left in place until the subscriber wants them to be removed. No special signaling protocol is necessary to handle PVCs. The next evolution in ATM networks is the provision of switched virtual circuits (SVCs), where the virtual circuits are created and destroyed dynamically as needed. This requires a protocol for exchanging messages necessary to set up and tear down SVCs. Such a protocol, known as SSCOP (service specific connection oriented protocol) has been specified in the ATM Adaptation Layer (AAL) in the control plane (also known as signaling AAL or SAAL). Its standardization is currently underway in the study group COM-XI of ITU-T. The issue of error monitoring for the virtual circuit (a PVC or SVC) running the SSCOP protocol must therefore be addressed.

Since error monitoring algorithms already exist for CCS, it is natural to investigate their use in the ATM context as well. Unfortunately, these prior art algorithms have several weaknesses that make them unsuitable in emerging telecommunication networks. Furthermore, the SSCOP protocol is also significantly different from the basic (i.e., level-2) communication protocol used in CCS so as to make a direct adoption of CCS error monitoring algorithms unsuitable. The CCS protocol and associated error monitoring algorithm is described hereinbelow to allow comparison with the SSCOP protocol and its error monitoring requirement.

The level-2 CCS protocol is the well-known "go back N" protocol (see e.g., A. Tanenbaum, *Computer Networks,* 2nd Ed., Prentice Hall, 1988, section 4.4, pp. 228–239). An arriving message goes into a FIFO (first-in, first-out) transmit buffer and waits its turn for transmission. After transmission, the message is saved in a retransmit buffer. The receiver acknowledges each message either with an ack (positive acknowledgement indicating the that the message was received correctly), or a nack (negative acknowledgement, which indicates that the message was corrupted). On receiving a nack, the corresponding message (and all messages following it in the retransmit buffer) are retransmitted. This ensures that the messages always arrive in proper order on the receive side. Another important characteristic of this protocol is that it transmits filler messages called FISUs (fill-in signal units) when it has no data to transmit. FISUs facilitate error monitoring by ensuring that the link always carries some traffic that can be monitored.

The error monitoring algorithm for 56 Kb/sec links is called SUERM (signal unit error rate monitor). SUERM is a "leaky bucket" algorithm and involves two parameters, denoted D and T. Each time SUERM receives an erroneous message, it increments an error counter $C_s$. If $C_s$ crosses the threshold T, the link is taken out of service and its traffic is diverted to an alternate link. The algorithm is tolerant of occasional errors, however. For this, it decrements $C_s$ after receiving a block of D messages (correct and erroneous ones). It should be noted that SUERM counts FISUs as well and thus is not significantly affected by the traffic level on the link. The ITU standards provide for one set of fixed values of D and T parameters for all links.

It is clear from this description that the SUERM algorithm will tolerate an error rate of up to approximately 1/D (i.e., when less than one out of every D messages is in error), but not significantly higher. A mathematical analysis of SUERM by V. Ramaswami and J. L Wang in "Analysis of the Link Error Monitoring Protocols in the Common Channel Signalling Network," *IEEE Transactions on Networking,* Vol. 1, Nov. 1, 1993, pp. 31–47, shows this behavior more clearly. If X denotes the time to take the link out of service, a plot of E(X) (i.e., average value of X) as a function of bit-error ratio (BER) is a curve having a "knee" when the message error ratio (MER) $q_m$ is 1/D. That is, for $q_m < 1/D$, E(X) increases drastically, and for $q_m > 1/D$, E(X) decreases slowly. This is a very desirable behavior, since it means that the link is taken out of service primarily when the error rate exceeds a threshold. The D parameter determines this threshold. The T parameter determines how sharp the knee is. Ideally, a "square knee" is desired so that the link will never be taken out of service if the error rate stays below the threshold.

In summary, although SUERM is a good algorithm for its application, its D parameter (or the threshold 1/D for the message error ratio) must be chosen properly. Given the message delay requirements, the maximum error rate that one can tolerate can be determined. This is called the sustainable error rate and is denoted as $q_b^*$ (for BER) or $q_m^*$ (for MER). Then $D=1/q_m^*$. It can be shown that the sustainable error rate depends on a number of parameters such as link speed, link length, message size, etc. Therefore, a single value of D will not work well for all links. This is the root cause of the problem with SUERM, as has been demonstrated by both laboratory tests and analysis.

Recently, there has been considerable interest in using 1.5 Mb/sec CCS links. The error monitoring algorithm for such links is known as EIM (errored interval monitor) (see e.g., D. C. Schmidt, "Safe and Effective Error Rate Monitors for SS7 Signaling Links", *IEEE Journal of Selected Areas in Communications,* Vol. 12, No. 3, April 1994, pp. 446–455). EIM is also a leaky-bucket algorithm that operates on time intervals (or slots) rather than individual messages. That is, a slot acts like a message for the purposes of error monitoring, which means that if any real message within a slot is errored, the entire slot is considered to be errored. EIM can be regarded as a slotted variant of SUERM. Slotted operation is attractive for high-speed links since it makes the sustainable error rate, and hence optimal D, independent of the message size. As with SUERM, optimal parameter selection for ElM still depends upon other network parameters.

SSCOP was designed specifically for modem high-speed networks which can be characterized by ample bandwidth and very low error rates and is thus quite different from the CCS protocol. Basically, SSCOP uses selective retransmission of errored messages along with periodic polling of the receiver by the transmitter. Messages are normally referred to as protocol data units or PDUs in SSCOP terminology. SSCOP is described in detail in the ITU document TD PL/11–20C Rev 1, "BISDN—ATM Adaptation Layer—Service Specific Connection Oriented Protocol", S. Quinn (ed.), 1993, which is incorporated herein by reference.

All user PDUs in SSCOP carry a sequence number (seqno) for detecting missing PDUs and for delivering them in proper order. The transmitter maintains a counter to keep track of the next seqno to send, and another one for the next seqno to acknowledge. The receiver also maintains two counters: one for the next sequence number expected, and the other for the highest sequence number expected. The latter counter will have a higher value than the former only when some PDUs get lost thereby causing a higher numbered PDU to arrive ahead of a lower number one. In such cases, the receiver alerts the transmitter by sending an unsolicited status message (ustat). The ustat identifies only the latest gap in sequence numbers (not the preexisting ones) and is intended to evoke the retransmission of PDUs in this gap.

The transmitter periodically sends a poll message to the receiver to enquire its status. In reply, the receiver sends a solicited status (stat) message, which contains a list of all currently existing gaps. The transmitter, in turn, retransmits all missing PDUs. Three buffers are needed on the transmit side to maintain all PDUs. These are a transmit buffer, a retransmit buffer, and a "bag" buffer. The first two are FIFO queues and are used for first-time transmission (user, poll, star, and ustat PDUs) and user PDU retransmission, respectively. The retransmit queue has a nonpreemptive priority over the transmit queue. The bag contains all unacknowledged PDUs. The purpose of the bag is to retain PDUs so that they will be available for retransmission.

Unlike CCS, there are no FISUs (fill-in signal units) in SSCOP; therefore, no transmission will occur when there is no user traffic. SSCOP is designed to ride on the ATM layer; however, as far as the error monitoring is concerned, this fact is irrelevant.

In a simple 2-node ATM network running SSCOP, two nodes are connected via two unidirectional links (actually, ATM virtual circuits) for forward and backward direction transmission. FIG. 1 shows a pictorial representation of the functional and hardware related activities connected with user PDU transmission in the forward direction. In particular, user PDUs and polls go in the forward direction whereas the corresponding stats and ustats for those PDUs go in the reverse direction. Similar transmissions occur for the other direction as well, but are not shown in order to simplify the figure.

The arriving user PDUs at 101 are placed in the transmit (xmit) buffer 102 and a copy of each (1(13) is saved in the bag 104 for possible retransmissions. Poll generation is controlled by a programmable poll timer 105. At the end of every polling interval, the poll timer 105 generates a poll and the timer is restarted. Polls (along with stats/ustats for the reverse direction) are also input into the transmit buffer 102. Copies of polls, stats and ustats are not saved since these PDUs are never retransmitted. When a PDU gets to the head of the queue, it is picked up for service by server 106. The PDU is segmented into ATM cells and then transmitted. The transmitted cells suffer propagation delay (108) over the forward ATM link 107. The ATM cells are then received by a receiver 109 on the receiving end of the forward link and assembled into a PDU, which is then checked for errors. If the PDU is uncorrupted, receiver 109 checks its type, which could be user, poll, stat or ustat (the latter two for reverse direction transmissions). An uncorrupted user PDU is placed into the receive buffer 110 for delivery to output 111. Delivery to output 111 may occur immediately if the PDU has the next expected sequence number; otherwise, the PDU is held in the receive buffer 110 until all PDUs with lower sequence number have been received correctly and delivered.

A received uncorrupted poll results in the generation of a stat message by stat generator 112, which lists all the existing sequence number gaps in the receive buffer 110. Finally, uncorrupted stats/ustats (for reverse direction transmissions) result in the retransmission on the reverse link I 15 through server 116 of missing PDUs placed in retransmit buffer 114 from a bag (not shown).

All corrupted messages (user, poll, stat, or ustat) are simply discarded at the receiving end of either the forward or reverse links. In the case of a corrupted user PDU, an uncorrupted user PDU will eventually arrive. If this uncorrupted PDU has a sequence number higher than the highest expected sequence number, ustat generator 118 generates a ustat and enters it into the transmit buffer 113 for transmission to the transmitting end of the forward link. The PDUs in the reverse direction also go through the usual process of segmentation (if necessary), transmission on link 115 (having the usual propagation delay 119), and reception, assembly, and error checking by receiver 121. If a stat or ustat PDU is corrupted, it is simply discarded, otherwise, it results in retransmission of missing user PDUs. For this, receiver 121 first locates all desired PDUs in the bag 104, makes a copy (122) of them, and places the copies in the retransmit buffer 123. As stated before, retransmissions get higher priority over transmissions. Thus, server 106 will not serve transmit buffer 102 while there are any PDUs in the retransmit buffer 123 awaiting to be transmitted.

The prior art error monitoring algorithms for CCS cannot be readily adapted for SSCOP. Specifically, the optimal choice of parameters for leaky bucket algorithms such as the previously described SUERM and ElM depend on the sustainable error rate, which is dependent upon the network parameters such as link length, link speed, offered load, error characteristics and message characteristics. In broadband applications these network parameters can vary significantly. Thus link length for terrestrial links may span from zero to about 5000 miles and satellite links may be up to 15,000 miles long. Currently, the link speeds for SSCOP are envisaged to range from 64 Kb/s to 4 Mb/s. In the future, even higher speed links are possible. Errors may come either singly or in bursts of varying severity and duration and the message size distribution may vary widely depending on the application. Because of all of these actors, it is difficult to use one or even a few error monitor parameter sets to cover the entire range of network parameters. Furthermore, these prior art algorithms were designed for situations where FISUs are transmitted when there are no regular user messages to transmit. In the absence of FISUs in SSCOP, the message error probability decreases directly as the traffic decreases. Thus, the prior art algorithm may fail to remove a link from service at low load levels.

SUMMARY OF THE INVENTION

An object of the present invention is to monitor error performance with an algorithm that is not strongly dependent on the network parameters.

An additional object of the present invention is to monitor error performance with an algorithm that covers a wide range of network parameters with only a single set of error monitor parameters.

The error monitoring algorithm of the present invention relies on retransmission count monitoring at the transmit end of a link. A quality of service (QOS) factor is computed based on the number of retransmissions needed to get an uncorrupted PDU through to the receive end of the link. The transmitting end of each link is therefore required to store a retransmission count associated with each PDU saved in the transmitter end bag.

In accordance with the algorithm of the present invention, at the end of each polling interval a maximum retransmission count of PDUs is determined. In the preferred embodiment, this maximum retransmission count is determined from amongst those PDUs which were retransmitted in the just completed polling interval. The average maximum retransmission counts over a block of a plurality (N) of consecutive polling intervals is then computed to yield the QOS factor. If the QOS factor exceeds a predetermined threshold, then the link is taken out of service. If not, the algorithm starts over and performs the same computations over the next block of consecutive polling intervals. The two parameters of the algorithm are therefore the number of polling intervals in a block and the threshold, and once selected are used for all network parameters.

DETAILED DESCRIPTION

As noted above, the algorithm of the present invention computes a QOS factor based on the number of retransmissions needed to get an uncorrupted PDU through to the receiving end. This approach covers a wide range of network parameters with only a single set of error monitor parameters. The main attraction of a retransmission count based algorithm is that a suitable value for the QOS threshold does not depend strongly on the network parameters. Rather, the number of retransmissions suffered by a given PDU is directly governed by the mean error rate (and to some extent by the nature of the errors), and has nothing to do with network parameters such as link length or link speed.

Figure 1:
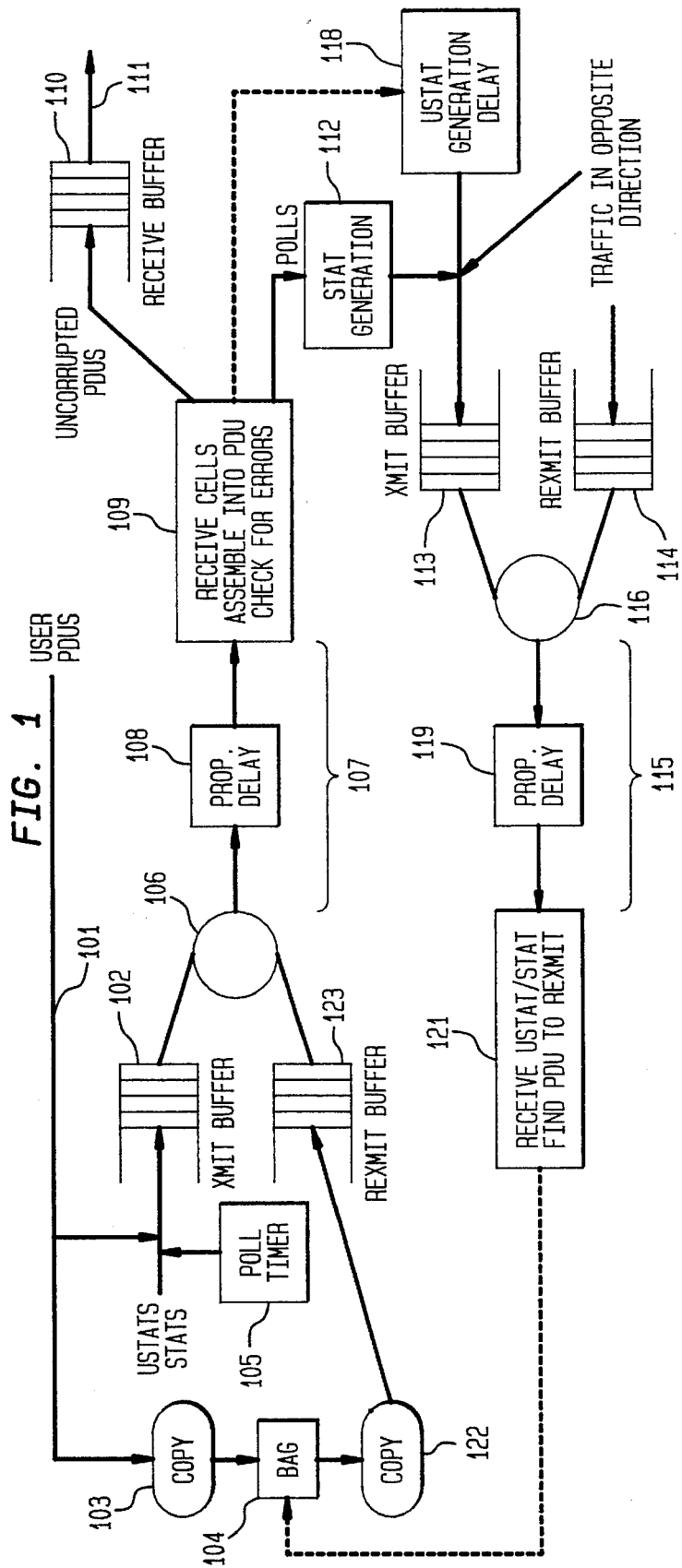
FIG. 1 is a pictorial representation of the functional and hardware related activities connected with user PDU transmission in the forward direction for SSCOP.
Figure 2:
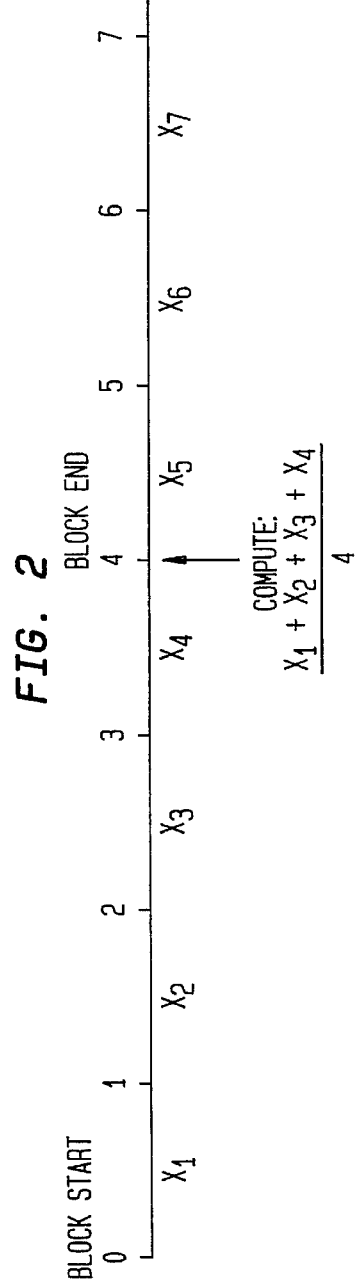
FIG. 2 shows the time varying mechanism for calculating the QOS factor over a plurality of polling interval.

As noted above, the algorithm works over a block of N consecutive polling intervals, where N is a parameter of the algorithm. For each polling interval in the block, the maximum retransmission counts of the PDUs that were retransmitted over the interval are computed. If no PDUs are retransmitted over the interval, the maximum retransmission count is taken to be zero. The QOS factor is then computed as the arithmetic average of these maximum retransmission counts. If the QOS factor exceeds a threshold $r_t$ (which is another parameter of the algorithm), the link is taken out of service. FIG. 2 illustrates this mechanism for N=4. The maximum retransmission counts are first computed over the four successive polling intervals, denoted as $x_1$, $x_2$, $x_3$, and $x_4$ in FIG. 2. At the end of the fourth interval, the QOS factor, qos, is computed as $qos=(x_1+x_2+x_3+x_4)/4$. It is then determined if $qos>r_t$. If not, the algorithm starts over and performs the same computations over the next four polling intervals.

This description suggests that the algorithm does not take any action during polling intervals that are not a multiple of N. For example, in FIG. 2, if $qos<r_t$ at the end of interval #4, no action will be taken during intervals #5, #6, and #7. Also, the algorithm makes no use of information from the previous blocks. Such a scheme may result in jittery behavior, which will manifest itself into high variability in the time to take the link out of service under constant error rate. This problem can be handled using a sliding block design or a smoothed fixed block design, described below.

During any polling interval using a sliding block design, the block is defined by the previous N polling intervals. Thus, the condition $qos>r_t$ is evaluated at the end of every polling interval. Basically, this amounts to using a "moving average" of maximum retransmission counts over the last N intervals.

The smoothed fixed block design is a modification of the basic scheme in which qos is computed as a weighted combination of the qos for the current block and the last computed qos. That is, exponential smoothing is used over successive blocks. Specifically, if curr_qos represents the QOS factor calculated for the current block of N polling intervals, then the smoothed QOS, qos, is defined as: $qos=\alpha \cdot qos+(1-\alpha)$ curr_qos, where qos on the right side of the equation is equal to the previously computed QOS factor. The parameter $\alpha$ gives the extent to which the past history is used for computing the new QOS factor. A larger $\alpha$ results in less jitteriness, but also increases the time to take the link out of service.. A reasonable approach is to choose $\alpha$ in 10–30% range, and reduce N appropriately.

Undoubtedly, the sliding block design will have less jitteriness than the smoothed fixed block design; however, it also requires storage of maximum retransmission counts over the last N intervals. It has been experimentally found, however, that the sliding block design is not significantly better than the smoothed fixed block design in most situations.

The algorithm of the present invention also puts a hard limit, L, on transmit congestion, since this is very easy to do for transmit side error monitoring. In experimental simulations of the algorithm, the limit L was computed by allowing no more than a two second first transmission delay for a PDU. The general rule would be to set L large enough so that congestion induced link failure occurs only rarely and under heavy loads since this is not intended to be the primary error monitoring scheme.

Figure 3:
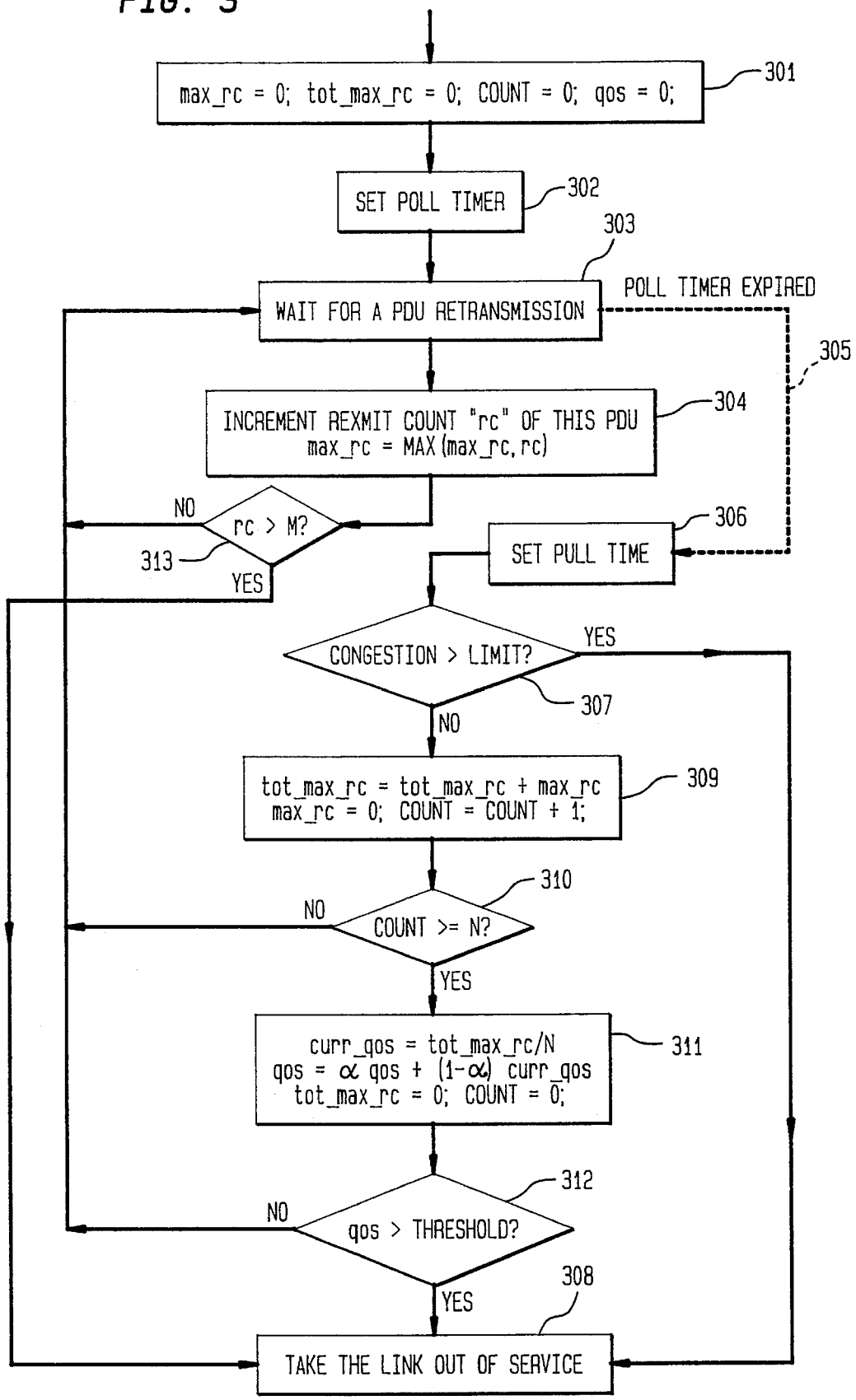
FIG. 3 is a flowchart detailing the algorithm of the present invention.

A flowchart of the algorithm is shown in FIG. 3. The variables used in this flow-chart are: ● max_rc: Maximum over the retransmission counts of all PDUs that were retransmitted during a polling interval. ● tot_max_rc: Running sum of max_rc's over successive polling intervals. ● count: Running count of polling intervals; needed to decide when a block has ended. ● congestion: Number of PDUs in the bag (this automatically includes the number of PDUs in the transmit and retransmit buffers). ● curr_qos: QOS factor estimate for the current block. ● $\alpha$: Exponential smoothing factor.

The implementation of the algorithm requires maintaining the retransmission count for all messages in the bag. It should be noted that SSCOP already maintains an associated poll sequence number with each message stored in the bag. Storage of a retransmission count can be similarly handled. The retransmission count of a PDU will be initialized to zero when it is initially placed in the bag.

At initial step 301, prior to the initiation of a polling interval, max_rc, tot_max_rc, count and qos are set to zero. At step 302, the poll timer is initially set and a PDU retransmission is awaited at step 303. Upon a PDU retransmission, at step 304 the retransmit count of this PDU is updated and the maximum transmission count of all PDUs that were so far retransmitted in this polling interval is determined from the previously determined maximum within this interval and the incremented retransmit count of the PDU just retransmitted. As new PDUs are retransmitted within this same polling interval, step 304 continues to determine the maximum retransmit count, max_rc, of all retransmitted PDUs within the interval.

When the polling interval is over, indicated by the poll timer expiring (305), the poll timer is set again (step 306) to begin the next sequential interval. At this point a determination is made whether the congestion (the number of PDUs in the bag) is greater than the predetermined limit (decision block 307). If so, the link is taken out of service at block 308. If not, calculations are performed (step 309) to determine the running sum of maximum retransmission counts over successive polling intervals. The maximum retransmission count, max_rc, is reset to zero for the next interval, and the count of polling intervals within the block is incremented by one. If this count is less than N (decision block 310), PDU retransmissions are awaited in this next polling interval and the previously described steps and decisions are repeated until the end of this interval.

When count reaches N, the block is complete (i.e, N polling intervals have passed) and the calculations necessary to determine qos associated with this block are performed (step 311). Thus the QOS factor estimate for this current block, curr_qos, is determined from the average over the past N polling intervals of the maximum retransmission counts. Then, qos is determined, using exponential smoothing, as a function of curr_qos and qos determined at the end of the previous block. The count of polling intervals and the running sum of maximum retransmission counts are reset to zero to restart the next block. If the calculated exponentially smoothed qos is greater than the predetermined threshold (decision box 312), the link is taken out of service (step 308). If not, the next block begins and the process returns to step 303 to await a PDU retransmission in the first polling interval within the next block.

In selecting an algorithm for determining a QOS factor from which a decision to take a link out of service, two conflicting objectives must be satisfied. These objectives are: (1) Reliability: The algorithm should use enough samples to ensure that it is responding to existing error conditions, rather than to low probability events; and (2)Sensitivity: The algorithm should take the link out of service before the PDUs experience large delays and more severe errors than the error checking mechanism (i.e., the CRC code in the PDU) is designed to handle.

The definition of QOS of the present invention addresses these two aspects by incorporating averaging (for reliability) and maximum operation (for sensitivity) over individual samples. Averaging increases reliability because it reduces the variability in the computed QOS factor. For the same reason, however, it decreases sensitivity and thus the speed of actuation. The max operation has the opposite effect: it increases sensitivity but decreases reliability. Both operations are needed to achieve a suitable level of reliability and sensitivity. The reason for using the max operation first is that it can better control the number of retransmissions that an individual PDU goes through and hence its delay. The result is the QOS factor of the present invention, which is the average of maximum retransmission counts. As described above, the specific embodiment of the algorithm of the present invention uses only the retransmission counts of those PDUs retransmitted in each polling interval. Alternatively, the maximum retransmission counts of all PDUs in the bag could be used, but would require reading the retransmission counts of all those PDUs in the bag with a concomitant reduction in efficiency and increase in cost.

The algorithm of the present invention requires choosing N and rt, the qos threshold. The choice of N is tied to another requirement of an error monitor: an error monitor should ride-over error bursts of any severity, provided that they do not persist longer than some period T. The period T is governed by the time needed to completely switch the traffic over to the mate link. Taking the link out of service too quickly would cause more delays than simply leaving it alone. In most situations, T=300 ms is adequate, which was used in computer simulations of the algorithm. Let $\tau$ denote the polling interval. Thus, N, the number of polling intervals needed to make a decision must be larger than $\lceil T/\tau \rceil$, where $\lceil x/y \rceil$ is the next highest integer in x/y. For purposes of evaluating the algorithm, values of N=4 and $r_t$=0.9 were used. For the smoothed fixed block design an $\alpha$ equal to 0.1 was used.

Computer simulations of the algorithm of the present invention were performed to evaluate it. Results indicated that the algorithm performed reasonably well in all cases without any changes to its parameters provided that the protocol parameters, such as polling interval, are chosen properly. Insensitivity of the algorithm with respect to various network parameters does not mean an absolute insensitivity of E(X) to BER. For example, as the link speed increases, the sustainable BER will go down, which means that a faster link should be taken out of service comparatively faster. A "good" algorithm should automatically track the sustainable BER for different protocol or network parameters, which is what is required of the present algorithm. Computer simulations of the algorithm of the present invention showed substantial performance insensitivity to link length and good tracking ability with respect to link speed. It also showed small sensitivity with respect to link loading. Furthermore, it was also insensitive with respect to error and message size characteristics. Although the algorithm shows desirable behavior at low loads, it may take too long to pull the link out of service when the offered load is very small (e.g., a few percent [or lower] of the engineered load). The algorithm can be refined to handle this situation by putting a limit on the retransmission count of individual PDUs. That is, with reference again to FIG. 3, after step 304, a check is made at step 313 to determine whether the incremented retransmission count, rc, of the just retransmitted PDU, exceeds a predetermined limit M. If so, the link is immediately taken out of service. Here M is chosen as some large integer value, such as 5, so that this refinement comes into play only at very low loads.

The algorithm of the present invention has been described as a retransmission count based error monitoring algorithm for use with SSCOP protocol of ATM adaptation layer. The algorithm has the desired characteristic that a single set of parameters is adequate for a wide range of link lengths, link speeds, message sizes, offered loads and error characteristics. This makes the algorithm much superior to other known algorithms such as EIM or SUERM since good choices of parameters for those algorithms depend on link and traffic characteristics.

Although the algorithm has been described hereinabove in the context of SSCOP protocol, it is not tied to SSCOP. In particular, it is not necessary that the underlying network be an ATM network. The details of SSCOP are also irrelevant. For example, one could always define a suitable error monitoring interval independent of the polling mechanism of SSCOP. The algorithm is also independent of precisely how the transmit end learns of an error. Furthermore, the algorithm is not limited for use on signaling networks, and can be used on any network incorporating selective retransmission of messages of any kind where only those messages which are lost or received in error by the receiver are retransmitted. Thus, the algorithm could be exploited in a variety of circumstances in communication networks.

The above-described embodiment is illustrative of the principles of the present invention. Other embodiments could be devised by those skilled in the art without departing from the spirit and scope of the present invention.

What is claimed is:

1. A method of error monitoring a communications link on which messages are transmitted between a transmitter and a receiver, which transmitter retransmits only those messages either received in error or not received by the receiver, and which transmitter stores each message until it is correctly received by the receiver together with a retransmission count of the number of times each message is retransmitted, said method comprising the steps of:

1) in a fixed interval, determining the maximum retransmission count for each message stored in the transmitter;

2) for a block comprising a plurality (N) of successive fixed intervals, computing the average of the maximum retransmission counts for those messages stored in the transmitter during those successive fixed intervals to determine a quality of service factor, said quality of service factor being determined after every current fixed interval based on the average of the maximum retransmission coupes of a block that ends with the current fixed interval;

3) comparing said quality of service factor with a predetermined threshold; and 4) removing the link from service if the quality of service factor of the block is greater than the predetermined threshold.

2. A method of error monitoring a digital communications link on which messages are transmitted between a transmitter and a receiver, which transmitter retransmits only those messages either received in error or not received by the receiver, and which transmitter stores each message until it is correctly received by the receiver together with a retransmission count of the number of times each message is transmitted, said method comprising the steps of:

1) in a fixed interval, determining the maximum retransmission count for each message stored in the transmitter and which was retransmitted in that fixed interval;

2) for a block comprising a plurality (N) of successive intervals, computing the average of the maximum retransmission counts for those messages stored in the transmitter during those successive fixed intervals to determine a quality of service factor, said quality of service factor being determined after every current fixed interval based on the average maximum transmission count of a block that ends with the current fixed interval;

3) comparing said quality of service factor with a predetermined threshold; and 4) removing the link from service if the quality of service factor of the block is greater than the predetermined threshold.

3. A method of error monitoring a communications link on which messages are transmitted between a transmitter and a receiver, which transmitter retransmits only those messages either received in error or not received by the receiver, and which transmitter stores each message until it is correctly received by the receiver together with a retransmission count of the number of times each message is transmitted, said method comprising the steps of:

in a fixed interval, determining the maximum retransmission count for each message stored in the transmitter;

for successive blocks each comprising a plurality (N) of successive fixed intervals, computing the average of the maximum retransmission counts for those messages stored in the transmitter during those successive fixed intervals to determine a quality of service factor, said quality of service factor being determined at the end of a current block as a weighted function of the quality of service factor of a previous block and the average maximum retransmission count for the current block;

comparing the quality of service factor with a predetermined threshold; and removing the link from service if the quality of service factor of the block is greater than the predetermined threshold.

4. The method of claim 3 wherein the link is on an ATM network.

5. The method of claim 4 wherein the messages are signaling messages.

6. The method of claim 5 wherein the signaling messages are transmitted under a service specific connection oriented protocol (SSCOP).

7. The method of claim 3 further comprising the step of removing the link from service if the number of messages stored at the transmitter for retransmission is greater than a predetermined number.

8. The method of claim 3 further comprising the step of removing the link from service whenever the retransmission count of any message exceeds a predetermined number.

9. A method of error monitoring a digital communications link on which messages are transmitted between a transmitter and a receiver, which transmitter retransmits only those messages either received in error or not received by the receiver, and which transmitter stores each message until it is correctly received by the receiver together with a retransmission count of the number of times each message is transmitted, said method comprising the steps of:

in a fixed interval, determining the maximum retransmission count for each message stored in the transmitter and which was retransmitted in that fixed interval;

for successive blocks each comprising a plurality (N) of successive fixed intervals, computing the average of the maximum retransmission counts for those messages stored in the transmitter during the block to determine a quality of service factor, said quality of service factor being determined at the end of a current block as a weighted function of the quality of service factor of a previous block and the average maximum retransmission count for the current block;

comparing the quality of service factor with a predetermined threshold; and removing the link from service if the quality of service factor of the block is greater than the predetermined threshold.

10. The method of claim 9 wherein the link is on an ATM network.

11. The method of claim 10 wherein the messages are signaling messages.

12. The method of claim 11 wherein the signaling messages are transmitted under a service specific connection oriented protocol (SSCOP).

13. The method of claim 9 further comprising the step of removing the link from service if the number of messages stored at the transmitter for retransmission is greater than a predetermined number.

14. The method of claim 9 further comprising the step of removing the link from service whenever the retransmission count of any message exceeds a predetermined number.

* * * * *